(12) United States Patent
Ray et al.

(10) Patent No.: US 11,576,417 B2
(45) Date of Patent: Feb. 14, 2023

(54) METHOD OF MANUFACTURING A FROZEN CONFECTION WITH LOW SFA COATING AND PRODUCT OBTAINED

(71) Applicant: NESTEC S.A., Vevey (CH)

(72) Inventors: Joydeep Ray, Epalinges (CH); Olivier Schafer, Epalinges (CH); Johann Buczkowski, Corcelles-le-Jorat (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/763,485

(22) PCT Filed: Sep. 29, 2016

(86) PCT No.: PCT/EP2016/073374
§ 371 (c)(1),
(2) Date: Mar. 27, 2018

(87) PCT Pub. No.: WO2017/055519
PCT Pub. Date: Apr. 6, 2017

(65) Prior Publication Data
US 2018/0263274 A1 Sep. 20, 2018

(30) Foreign Application Priority Data
Sep. 30, 2015 (EP) .................................. 15187786

(51) Int. Cl.
*A23P 20/10* (2016.01)
*A23G 9/48* (2006.01)
*A23P 20/17* (2016.01)
*A23G 9/32* (2006.01)

(52) U.S. Cl.
CPC .............. *A23P 20/11* (2016.08); *A23G 9/322* (2013.01); *A23G 9/327* (2013.01); *A23G 9/48* (2013.01); *A23P 20/17* (2016.08); *A23G 2200/08* (2013.01); *A23G 2200/14* (2013.01); *A23V 2002/00* (2013.01); *A23V 2250/1882* (2013.01)

(58) Field of Classification Search
CPC .......... A23G 9/322; A23G 9/327; A23G 9/48; A23P 20/11; A23P 20/17
See application file for complete search history.

(56) References Cited

U.S. PATENT DOCUMENTS 5,891,495 A * 4/1999 Cain ...................... A23D 9/013
426/101
5,939,114 A 8/1999 Cain et al.
2011/0008499 A1 1/2011 Akahane et al.
2014/0065283 A1 3/2014 Fine et al.

FOREIGN PATENT DOCUMENTS

| | | |
|---|---|---|
| CN | 101909457 A | 12/2010 |
| DE | 69507720 | 3/1999 |
| GB | 2066646 A | 7/1981 |
| RU | 2376782 C2 | 12/2009 |
| WO | 9514392 A1 | 6/1995 |
| WO | 9610338 | 4/1996 |
| WO | 03075672 | 9/2003 |
| WO | 2007090477 A1 | 8/2007 |
| WO | 2008064962 | 6/2008 |
| WO | 2010072481 | 7/2010 |
| WO | 2014036557 | 3/2014 |

OTHER PUBLICATIONS

International Dairy Foods Association "Tips on Storing & Handling Ice Cream" p. 1 Apr. 15, 2014 https://www.idfa.org/news-views/media-kits/ice-cream/tips-on-storing-handling-ice-cream (Year: 2014).*
Tovatech Understanding Temperature Cycling in Lab Refrigerators and Freezers, pp. 1-4 May 12, 2011 https://www.tovatech.com/blog/2335/lab-refrigerator/temperature-cycling-in-lab-friges-and-freezers (Year: 2011).*
SunflowerUSA "Sunflower Oil Fatty Acid Profile" p. 1, May 9, 2013 https://www.sunflowernsa.com/health/sunflower-oil-fatty-acid-profiles/ (Year: 2013).*
Depoortere "The use and applicability of cocoa butter equivalents (CBEs) in chocolate products" 2011 pp. 1-9 https://lib.ugent.be/fulltxt/RUG01/001/789/812/RUG01-001789812_2012_0001_AC.pdf (Year: 2011).*
Arbuckle et al "Ice Cream 2nd Edition" The AVI Publishing Group 1972 pp. 267 and 275 (Year: 1972).*
Cebula et al "Chocolate and couvertures: applications in ice cream" Science and technology of enrobed and filled chocolate, confectionery and bakery products 2009 pp. 163-182 (Year: 2009).*
Hashimoto et al "Preparation of Sharp-Melting Hard Palm Midfraction and Its Use as Hard Butter in Chocolate" JAOCS vol. 78, No. 5 2001 pp. 455-460 (Year: 2001).*
Encyclopedia Britannica "Oleic acid" https://www.britannica.com/science/oleic-acid pp. 1-11. printed Jul. 2020.*
Tielin, "Principles and Applications of Chemical Crystallization Processes", 1st Edition, Apr. 30, 2006, pp. 421-422.
Office Action Received for Application No. CN201680056893.9, dated Apr. 6, 2021, 19 Pages(8 Pages of English Translation and 11 Pages of Official Copy).
Chinese Office Action for Appl No. 201680056893.9 dated Oct. 28, 2021.

* cited by examiner

*Primary Examiner* — Jyoti Chawla
(74) *Attorney, Agent, or Firm* — K&L Gates LLP

(57) ABSTRACT

The invention relates to a method of manufacturing a frozen confection comprising providing a frozen confection to be coated, providing a liquid coating composition which comprises less than 25% of saturated fatty acids and which solidifies in a two-step crystallization at a temperature of −15° C., at least partly coating the frozen confection, letting the coating composition perform a first crystallization event, and letting the at least partly coated frozen confection perform a second crystallization event. The invention also relates to a at least partly coated frozen confection obtained by this method of manufacturing.

13 Claims, 3 Drawing Sheets

METHOD OF MANUFACTURING A FROZEN CONFECTION WITH LOW SFA COATING AND PRODUCT OBTAINED

CROSS REFERENCE TO RELATED APPLICATIONS

The present application is a National Stage of International Application No. PCT/EP2016/073374, filed on Sep. 29, 2016, which claims priority to European Patent Application No. 15187786.7, filed on Sep. 30, 2015, the entire contents of which are being incorporated herein by reference.

FIELD OF THE INVENTION

The present invention relates to a method of manufacturing a frozen confection with a low saturated fatty acid coating. The invention also relates to a product obtained by such a method.

BACKGROUND

Coated frozen confections are products which are highly appreciated by consumers. Texture and nutritional profile of the coating is driver for consumer preference.

With the increasing concern for health and wellness there is an increasing need for reducing calories, sugars and fats also in frozen confections and how to manufacture such coatings.

Chocolate-like or compound coatings based on vegetable fats are commonly used for coating frozen confection. The crystallization of the fats in a coating are a key contributor to the physical properties of a coating, in particular its textural properties (brittleness, melting) and setting time. Traditionally compound coatings for frozen confection have been manufactured with high proportions of lauric fats (e.g. coconut oil and palm kernel oil) which have a saturated fatty acid (SFA) level about 90%. With high amounts of lauric fats in the coatings, the SFA levels in the finished coating are typically between 30 and 60%.

Regarding fats the consumers are looking for products which are healthier but provide the same properties to the product. Solutions to this problem exist in the form of coatings blends comprising particular liquid oils which are lower in SFA and fractions of palm oil. The viscosity of these blends is important for achieving the SFA reduction because too viscous coating will result in more coating in the finished product and consequently a bigger quantity of SFA.

EP2099313 (Nestec) discloses an ice confection having an ice confection core and a snappy outer compound coating layer that has a reduced saturated fatty acid content. The fat in the compound coating is a mixture of fractionated palm oil and liquid oil. This compound coating has similar textural characteristics to that of conventional products, particularly 'snappiness'. This coating provides advantages in terms of substantial SFA reduction. Nevertheless, there continue to be a need for further reduction of SFA.

EP2367441 (Unilever) discloses a composition for coating a frozen confection is provided, the composition comprising from 63 to 70 wt % of a fat component comprising: 70 to 925 wt % of a palm oil fraction or blend of fractions which contains at most 8 wt % of S3 triglycerides and has a S2U: SU2 ratio of >2.5; 5 to 15 wt % of a liquid oil; and 0 to 15 wt % of cocoa butter. The terminology S and U denote the fatty acid residue in the triglycerides, wherein S is for saturated fatty acid and U stands for unsaturated fatty acids.

These characteristics refer to a combination of liquid oils and palm mid fraction, as stated in the application, namely Creamelt 900, Creamelt 700; containing >60% solids at 20° C. However, in order to achieve the right physical attributes of the coating, a higher fat content i.e. 63-70 wt % comprising palm oil fraction or blend of fractions of at least 85 wt % and 5-15 wt % of a liquid oil is required. The application requires high amount of fat component necessary to be in a coating which in turn limits the overall SFA content and thickness of the coating.

Several prior art has used interesterified fats as a structuring agent to produce low saturated coating for confectionery products. Interesterification is a process to modify the physico-chemical properties of fats and oils such as, texture, mouthfeel, crystallization and melting behaviour. Interesterification involves an acyl-rearrangement reaction on the glycerol molecule in presence of chemical catalyst or enzymes. Saturated fatty acids are not common in the central "2 position" of natural triglycerides. They are more common in interesterified fats, where the interesterification process has re-arranged the positions of the fatty acids. WO 2014/036557 A1 (Aarhus Karlshamn USA Inc.) discloses a low saturated fat composition for coating confectionery products, the composition comprising 24-35 wt % of fat and 55-75 wt % of non-fat solids, wherein the fat component comprises 35-80 wt % of a structuring agent and 20-65% of liquid oil. The structuring agent comprises an interesterified blend of palm stearin and palm kernel stearin.

US 2011/008499 A1 (Akhane Akira [JP]) discloses a coating composition for confectionery products, the composition comprises an interesterified oil (A) that is non-selectively interesterified and contains 80 wt % or more of a fatty acid having 16 or more carbon atoms and 35 to 60 wt % of a saturated fatty acid having 16 or more carbon atoms in its constituent fatty acids, and an interesterified oil (B) that is non-selectively interesterified and contains 20 to 60 wt % of a saturated fatty acid having 12 to 14 carbon atoms and 40 to 80 wt % of a saturated fatty acid having 16 to 18 carbon atoms in its constituent fatty acids. The composition also included a tri-saturated fatty acid acylglycerol in a content of 10 to 15 wt %.

Further GB 2 297 760 A (Loders Croklaan BV [NL]) discloses a coating composition for confectionery products, the composition comprises at least 40% BOO triacylglycerides and displaying a solid fat content of N30≥10 and having a major peak above 23° C.

The prior art described above requires the use of interesterified fats and oils as well as application of high melting lipid component to achieve physical functionalities (for e.g. crystallization speed and harder texture) of low saturated confectionery coatings. Also the prior art does not show how to further substantially reduce the SFA level in a coating composition for frozen confection.

The prior art does not show how to further substantially reduce the SFA level in a coating composition for frozen confection.

There is a need to have coatings for frozen confections where the physical attributes of the coating meet the requirements of the parameters, e.g. dripping and setting time, pick-up weight, plastic viscosity and yield value without impact on coating breakage or bleeding. These coating should be manufactured in an efficient way. There is therefore a need for an efficient method of manufacturing a frozen confection.

OBJECT OF THE INVENTION

It is thus the object of present invention to provide a method for manufacturing a reduced SFA coating for frozen confectionery products, said coating having physical properties acceptable for the consumers.

A second object the present invention is to provide a coating composition for frozen confectionery with acceptable processing characteristics and beneficial in the manufacturing of coated frozen confection.

SUMMARY OF THE INVENTION

The present invention allows the manufacturing of low SFA compound coatings for frozen confection which exhibits good and comparable textural properties as traditional compound coatings containing significant amount of SFA. The low SFA fat blends developed in accordance with the current invention can achieve a SFA level from fat and oil additives that is reduced up to 50% compared to conventional compound coatings while maintaining snap properties. The coating composition according to the invention has an SFA level from fat and oil additives of less than 25% SFA by weight, compared to 30 to 60% by weight in regular frozen confection compound coatings. The invention furthermore allows the SFA level to be reduced as low as 14 to 15% wt. SFA, still with satisfactory coating manufacturing, storage/handling and application of the coating.

According to a first aspect the present invention relates to a method of manufacturing a frozen confection comprising
providing a frozen confection to be coated,
providing a liquid coating composition which comprises less than 25% of saturated fatty acids and which solidifies in a two-step crystallization at a temperature of −15° C.,
at least partly coating the frozen confection,
letting the coating composition perform a first crystallization event, and
storing the at least partly coated frozen confection at a temperature which will allow a second crystallization event in the coating.

It has surprisingly been found that it is possible to use the above-described coating composition in the manufacturing of frozen confection, although it is expected that the complete solidification of the coating will be slower due to the larger amount of liquid oils added in the coating composition. Furthermore, for coating containing very low level of SFA e.g. about 15% SFA, with increased amount of liquid oil the amount of hard fat crystallizing is comparatively less. Even for such coatings though the setting time or crystallization time is longer, it has been found that frozen confection products can be coated and wrapped.

It has been found that the coating according to the invention meets the requirements of dripping and setting time, pick-up weight, plastic viscosity, yield value without impact on coating breakage or cracks.

In a second aspect, the invention relates to an at least partly coated frozen confection obtained by the method of manufacturing according to the invention.

DETAILED DESCRIPTION OF THE INVENTION

It has surprisingly been found that the wrapping of the product can take place before the second crystallization event takes place. Depending on the dripping and setting time of the coating the wrapping can be done within 5 min from coating step, preferably within 2 min from the coating step. It is more preferred that the wrapping takes place immediately after the setting of the coating of the frozen confection. This may be even within 1 min from the coating step. It is surprising that the wrapping can take place immediately after the coating and that with a solid fat content of 20 to 50% the coating material is sufficiently rigid to have a sufficient shape retention which allows the wrapping to be done without breaking or changing the coating surface. It has also surprisingly been found that the coating composition according to the invention which is considerably more liquid than conventionally coating (viscosity of invention vs viscosity of conventional coatings) will solidify in two stages. The first one when the coating is cooled to a lower temperature e.g. about −15° C. at the coating step or just after and a second solidification takes place during storage of the product.

Figure 1:
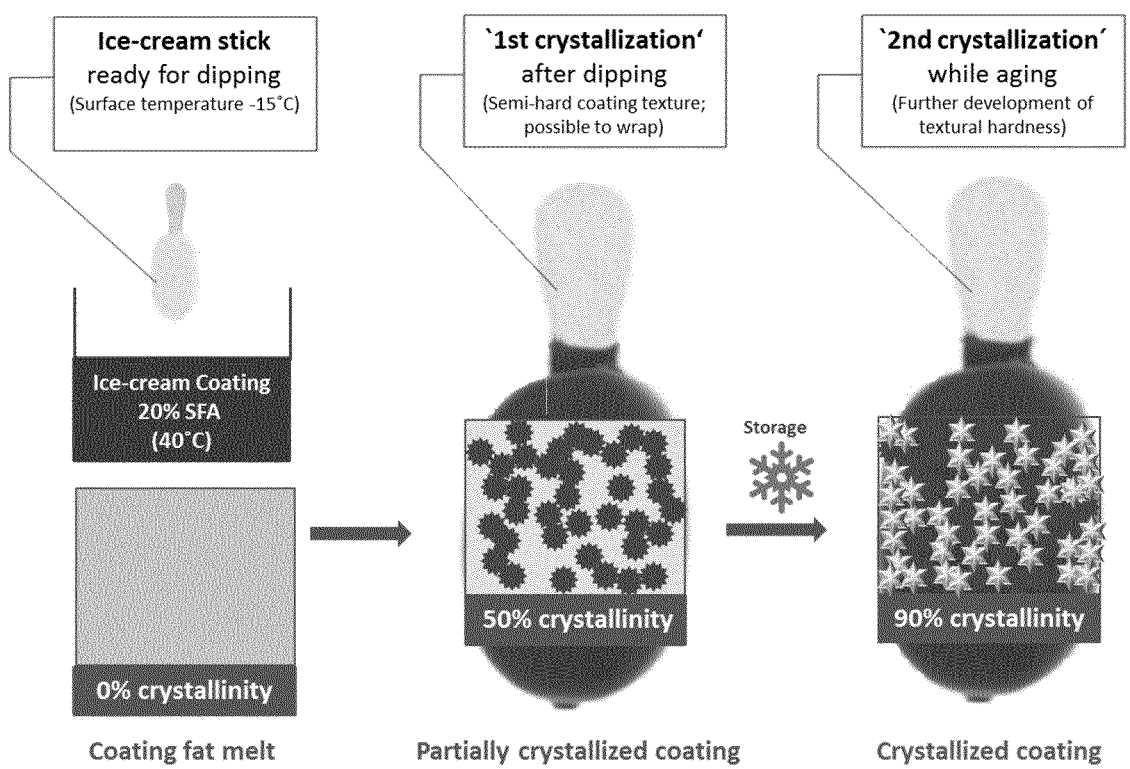
FIG. 1 shows schematic diagram of the 'two-step crystallization' process in low SFA coating used to coat a frozen confection.

Advantageously, in accordance with the present invention it was found that liquid oils with high oleic content (>70%) (e.g. High Oleic Sunflower oil) can contribute to the structuring or development of fat crystal network leading to higher solid fat content which provides hard textural properties. This allows further reduction of amount of SFA in the fat blends without compromising the hardness or snap properties. As shown in FIG. 1, in the present invention coating composition, an initial crystallization step can be achieved at a very low SFA level (i.e. 20%), which generates sufficient amount of solid fat content (~50%) or crystallinity within 2 minutes of crystallization. Then the solid fat content or crystallinity of the coating can be further increased (~90%) via a second crystallization step with adequate crystallization time. Surprisingly, it has been found that the early crystallization step would be sufficient enough to properly coat and wrap a frozen confection while the second crystallization step can occur as the frozen confection will continue to age in the storage units. So the frozen confection will be hard and provide similar snappiness like conventional high SFA coatings at the time of consumption.

Though the crystallization properties of liquid vegetable oils high in oleic content are known, structuring capabilities of the oils at subzero temperatures in a low SFA system are not. As described earlier, the textural properties of the coatings are mainly dependent on the crystallization/crystal packing of the hard fat and not from the liquid oils. Hence, generation of secondary fat crystal structure using liquid oil to improve the hardness or snap properties of the coatings has not been described previously. It is of real advantage, as with simple substitution of liquid oils having high oleic content, when blended with low SFA amounts in frozen confection compound coatings can generate crystal structure and textural hardness.

In the present context hard fat means that it has 70%, preferably above 75% of solid fat at ambient temperature i.e. about 20° C.

In the present context a hard palm mid fraction is a fraction produced via two-stage fractionation of palm oil, which has at least higher than 70% of solid fat at ambient temperature i.e. about 20° C. and less than 5% of solid fat content above 35° C.

Further in the present context liquid oil means that the oil is liquid at ambient temperature i.e. about 20° C. and contain less than 5% of solid fat content at 0° C.

In the present context a "two step crystallization" means two different events of crystallization occurring with isothermal holding time at particular temperature. It has been found that the first step is primarily crystallization of the hard fats, while the second crystallization is primarily from the liquid oils, said crystallization is only obtained after a period of time.

In the method of manufacturing according to the invention the composition provided comprises preferably 30 to 80 wt % of fat, which comprises a fat blend of hard fat and liquid oil. Below 30 wt % of fat the coating with this composition will be very viscous and not processable whereas above 80 wt % of fat the coating will not give the consumers a pleasant eating experience.

In a preferred embodiment of the invention the composition only contains non-interesterified fat and oil. It has surprisingly been found that it is possible to obtain a lower SFA coatings with comparable or better textural properties with non-interesterified fat. In the present context non-interesterified fat and oil is a fat or oil which has not been subject to interesterification, in particular interesterification involving an acyl-rearrangement reaction on the glycerol molecule in presence of chemical catalyst or enzymes.

Furthermore, in accordance with the invention the coating is preferably free of lauric fat. The advantage is a reduced SFA level in the coating and a retention of similar textural properties.

With the coating composition used in method according to the invention it is possible to obtain a coating which has less than 25 wt % of SFA. Even coatings with less than 20 wt. % SFA may advantageously be made with the coating composition according to the invention. Also coatings with less than 15 wt. % of saturated fatty acids may be obtained. A preferred level of SFA in the coating composition is 20 to 22 wt. % of saturated fatty acids.

The coating composition used in the method according to the invention advantageously comprises 10-60 wt %, preferably 20-40% of monounsaturated fatty acid and less than 10 wt %, preferably less than 5% of polyunsaturated fatty acid; and has and a saturated fatty acid comprises between 16-24 C-atoms and the unsaturated fatty acid contains 18 C atoms or more than 18 C atom.

It is preferred that the composition used in the method of manufacturing according to the invention has a fat blend comprising 35 to 65 wt % of fat, more preferably 40 to 58 wt % of fat, and 35 to 65 wt % non-fat solids, more preferably 42 to 60 wt % of non-fat solids. This range of fat content is preferred, as it contributes to achieve appropriate viscosity (along with addition of limited amount of emulsifiers) and preferred thickness of coating in frozen confections.

It is furthermore preferred that the fat blend of hard fat and liquid oil comprises 10 to 50 wt % of hard fat, more preferably 30 to 40 wt % of hard fat, and 10 to 50 wt % of liquid oil, more preferably 10 to 25 wt. % of liquid fat oil based on the weight of the coating. With more than 50 wt. % of liquid oil the coating will have a low melting point and be softer resulting in less resistance against temperature fluctuation during transportation and faster melting in hand when consumed.

The fat blend in the coating according to the invention crystallizes in a first and second crystallization step at a temperature of −15° C. and below. It has been found that the time between the first and second crystallizations can be regulated depending on the temperature. Lower the temperature; the faster is the second crystallization event (i.e. crystallization of the liquid triacylglycerols). Temperatures higher than −15° C. e.g. −10° C. are less suitable as it retards the second crystallization step of the blend and is close to the melting temperature of the liquid fraction in the fat blend (i.e. −5° C. to 5° C.). Temperature higher than −10° C. is also negatively affects the final textural properties of the coating.

It is therefore preferred that the at least partly coated frozen confection is stored below −10° C. while allowing the second crystallization to take place. More preferably the product is stored at a temperature below −14° C., even more preferably at −15° C.

It has been found that the fat blends according to the invention at a temperature of −15° C., displays a solid fat content of 20 to 50% within 2 min. of crystallization. Furthermore, a solid fat content is 70 to 85% after 60 min of crystallization.

Advantageously, the hard fat is selected from the group consisting of: palm oil hard fractions including stearin and mid fractions, shea stearin, interesterified palm oil hard fractions including stearin and mid fractions, interesterified shea stearin, cocoa butter, cocoa butter equivalents, cocoa butter replacers, or a combination thereof. Any oil mid fraction still hard at 20° C. is considered a hard fat in the present context.

In a preferred embodiment of the invention, the hard fat is hard palm mid fraction comprising above 60%, preferably above 64% of saturated fatty acid, C16 fatty acids which amount to 55% or more of the total fatty acids of the hard fat, and having a solid fat content at a temperature of 20° C. above 70%, preferably above 75%. The moderate amount of SFA present in the hard fats provides sufficient solid fat content after the 'first step' of crystallization of the compound coating. This in turn gives a mechanical resistance to the coatings during further processing (for e.g. wrapping and transportation).

The frozen confection may be wrapped at room temperature or at a temperature below.

Palm mid fractions are commercially available e.g. Ertifresh 100B from Fujioil Europe; Palmel 35 from Fujioil USA; and Creamelt 900 from Loders Croklaan.

The liquid oil may advantageously be is selected from the group consisting of: high oleic sunflower oil, high stearic high oleic sunflower oil, high oleic safflower oil, high oleic soybean oil, high oleic rapeseed oil, high oleic canola oil, high oleic algal oil, high oleic palm oil, high oleic peanut oil, olive oil, macadamia nut oil, moringa oleifera seed oil, hazelnut oil, avocado oil or a combination thereof.

In a particular preferred embodiment of the invention the liquid oil is high oleic sunflower oil, high oleic soybean or high oleic rapeseed oil such as high oleic canola oil comprising above 70%, preferably above 80% of monounsaturated fatty acid, below 10%, preferably below 5% of polyunsaturated fatty acid, in the liquid oil, displaying below 5% of solid fat content at 0° C., and wherein the unsaturated fatty acid contains 18C-atoms or more than 18C-atoms. Higher content of monounsaturated fatty acid (i.e. fatty acid with one double bond) in oils increases the oil melting temperature (−5° C. to 5° C.) which in turn allows the oil to solidify while providing a crystalline structure that develops around −15° C. and below. Higher amount of polyunsaturated fatty acids (i.e. fatty acid with more than one double bond) in oils lead to decrease the overall melting temperature (below −20° C.), hence do not crystallize at higher temperatures.

The coating composition according to the invention comprises 20 to 70 wt. % non-fat solids. The non-fat solids are preferably selected from the group consisting of: sugar, fibres, cocoa powder, milk powder, emulsifier and one or more flavours. The non-fat solids provide structure, flavour and colour to the coating.

In the present context the fat phase includes the in cocoa powder and milk powders. The fat in these powder are calculated in to the amounts of fat in the composition.

According to the present invention, the composition may comprise 0.1 to 2 wt. % of emulsifiers selected from sunflower lecithin, soya lecithin, polyglycerol polyricinoleate (PGPR; E476), ammonium phosphatide (YN; E442) or a combination thereof.

For chocolate flavoured coating the amounts of non-fat cocoa solids in the coating composition is below 30 wt. %, preferably from 0 to 15 wt. %, more preferably from 10 to 20 wt. %. For milk chocolate flavoured coating it is preferred that the amount of no-fat milk solids for milk chocolate is below 20 wt. %, preferably from 0 to 12 wt. %. To obtain other coatings no cocoa powder might be included at all.

A composition used in the method according to the invention may further comprise a structuring agent in an amount sufficient to provide strength and faster crystallization kinetic properties to the coating. The structuring agent may be agent can be monoacylglycerols, diacylglycerols, monoacylglycerol esters, sorbitan fatty acid esters, waxes, behenic acid, palm stearin, or a combination thereof.

It is preferred that the structuring agent is present in an amount of between about 0.2% and 3% by weight of the coating.

In particular preferred composition used in the method according to the invention, the coatings developed comprises a palm oil fraction, low SFA liquid oil and optionally, a structuring agent. FIG. 1 shows the evolution of solid fat content (SFC) of frozen confection coating fat blends with time, exhibiting different SFA content. The blends were crystallized isothermally at −15° C.

FIG. 1, gives an overview of the crystallization kinetics or solid fat development of a low SFA fat blend developed in the current invention with time (at −15° C.) when compared to a conventional high SFA fat blend and existing low SFA ice-cream coating fat blends. High SFA containing fats crystallize rapidly at lower temperatures displaying rapid increase in the solid fat content (>90%) and provides hard textural properties. As the SFA level is decreased by blending with liquid oils (E.g. sunflower oil), there is always a compromise with the development of solid fat (i.e. crystallization kinetics) and as well as good hardness, brittleness or snap properties. This is usually due to the dependence on the crystallization and packing properties of the SFAs available for generation of hard crystal structures and not on the added liquid oils. As common liquid oils have higher unsaturation, they crystallize slowly at very low temperatures (>−40° C.). Hence, it is very difficult to generate structures with liquid oils. Existing low SFA frozen confection fat blend (FIG. 1) containing sunflower oil or other liquid oils with higher amounts of polyunsaturated fatty acids (30 to 70%) can only achieve comparable hardness or snap to that of a high SFA fat blend at 50% SFA content (in fat phase).

Solids are preferably fillers such as fillers selected from the group selected from the group consisting of: sugar, fibers, cocoa powder, milk powder, emulsifier and one or more flavours.

Even with use of high amount of low SFA oil in the coating formulations, the hard fat fraction is sufficient to allow proper application on coated frozen confections. Contrary to the flexible coating obtained by previous art (e.g. as described in EP0783250B1), with the present invention a hard texture is obtained by making use of the slow crystallization properties of the low SFA oil high in monounsaturated fatty acid during aging in the storage freezer. This ensures to deliver harder texture when consumed. Balance in proportion of liquid oil in the compound coatings is required in order to provide the hard texture and melt behaviour compatible with frozen confection consumption by consumer.

The composition according to the present invention may be combined with known techniques to reduce the fat and SFA (saturated fatty acid) content of chocolate containing coating: EP2099313 (Nestec), and EP2367441 (Unilever). These patents neither address the problem of reducing the amount of SFA below 25% in compound coatings while maintaining the absolute quantity of fat.

Fat and sugars are homogenously mixed within the composition for coating a frozen confection. Solidification step of said composition is related to the crystallization of fat phase. Crystallization of fat phase will be influenced by the presence of other molecules, and any modification in the composition may have an influence on this crystallization/solidification step. Texture (snap or brittleness) of the coating of a frozen confection may be considered as a driver for consumer preference, therefore it is important to maintain this characteristic.

Advantageously the coating composition comprises 40 to 60 wt. % fat comprising a blend of 19 to 38 wt. % hard fat and, 16 to 20 wt. % liquid oil, 30 to 40 wt. % sugar, 0 to 15 wt. % cocoa powder, and 0 to 12 wt. % of non-fat milk solids.

In one embodiment of the method the liquid oil used is high oleic sunflower oil or high oleic soybean comprising above 65%, preferably above 80% of monounsaturated fatty acid; below 10%, preferably below 5% of polyunsaturated fatty acid; and displays below 5% of solid fat content at 0° C. In this embodiment the unsaturated fatty acid contains 18C-atoms or more than 18C-atoms.

In one particular preferred embodiment of the invention, the liquid oil is high oleic sunflower oil. The sunflower is particularly suitable in the scope of the present invention because they have a low SFA content, no off flavour and are reasonably priced.

According to another embodiment, the composition of the present invention may further comprise from 2 to 30 wt. %, preferably below 25 wt. % cocoa solids non-fat.

Below 2% the taste of cocoa will not be strong enough to be perceived by consumers as cocoa flavour; more than 30% is usually not suitable due to a very strong and bitter taste.

Furthermore, the composition according to the present invention may in a preferred embodiment comprise from 1 to 20 wt. % non-fat milk solids. Below 1% non-fat milk solids, the colour, flavour and texture of the composition is not satisfactory from a sensory point of view. Above 20% non-fat milk solids, no additional benefit is achieved.

In another embodiment the invention the method of manufacturing comprises a process step for producing a coating composition according to any of the preceding claims, wherein said process comprising the steps: providing the non-fat solids, the hard fat and the liquid oil, melting the hard fat, mixing non-fat solids with the at least part of the melted hard fat and obtaining a mixture of hard fat and non-fat solids, refining the mixture of hard fat and non-fat solids by milling to reduce the particle, preferably to a particle size to below 40 microns, adding the liquid oil to the refined mixture and optionally adding emulsifier to the refined mixture and/or the mixture with the liquid oil.

In an alternative process step of the invention the non-fat solids can be pre-milled in a separate process-step (e.g. by the use of air-classifier mills). The pre-milling step can then fully or partly replace the refining of the mixture of hard fat and non-fat solids by milling to reduce the particle.

The invention also relates to a frozen confection at least partly coated obtained with a method of manufacturing according to the invention.

Preferably, the frozen confection according to the present invention may have a coating thickness from 0.5 to 5 mm.

Furthermore, the frozen confection according to the present invention may be ice cream.

EXAMPLES

By way of example and not limitation, the following examples are illustrative of various embodiments of the present disclosure.

Fat Analysis:

Fats were analysed with standard methods:

The fatty acid composition was done using Gas Chromatography, IUPAC method 2.304. The fatty acids are expressed as % fatty acids based on fat. For fat blends the fatty acids of each fat was determined and then tabulated mathematically to arrive at the blend composition.

The solid fat content was determined using pulsed NMR (Nuclear Magnetic Resonance), Minispec mq20 NMR Analyzer, Bruker Biospin GMBH (Rheinstetten, Germany) using ISO-8292-1D method, non-tempered and with slight modification in time as mentioned below. Supplier standards which had solids at 0%, 31.1% and 72.8% solids were used to calibrate the equipment.

Approximately 2 g of melted fat was placed in a 10 mm NMR tube; samples were then pre-treated prior to testing to make sure it is fully melted. The fats were not tempered, heated to 60° C., and analyzed. Samples were held at 30 min at various temperatures (0, 10, 20, 25, 30, 35, 37 and 40° C.), and the values at each temperature was read in the NMR. Samples were run in duplicates, and the values were averaged. Isothermal crystallization was carried out at −15° C. Samples were maintained at −15° C. and solid fat content was recorded manually at defined intervals.

Example 1

Table 1 and 2 shows the specification for different fat and oil samples used where hard palm mid fraction and High Oleic Sunflower oil (HOSO) relates to the present invention and rest are comparative samples.

TABLE 1

Specifications of fat samples

| Specifications | Samples | | | | |
|---|---|---|---|---|---|
| | Coconut oil | Palm olein | Low SFA IC fat 1 | Low SFA IC fat 2 | Hard Palm mid fraction |
| Slip melting point (° C.) | 22 | 22 | 27 | 18 | 35 |
| Iodine value (gI2/100 g) | 10 | 57 | 50 | 61 | 35 |
| Saturated fatty acids (%) | 90 | 45 | 51 | 44 | 64 |
| Monounsaturated fatty acids (%) | 7 | 44 | 39 | 44 | 32 |
| Polyunsaturated fatty acids (%) | 3 | 11 | 10 | 12 | 4 |
| Solid fat content (%) | 20° C.-36 25° C.-<1 | 20° C.-8 25° C.-<1 | 20° C.-25 25° C.-10 30° C.-<1 | 20° C.-3 25° C.-<1 | 20° C.-81 25° C.-67 30° C.-19 35° C.-2 |

TABLE 2

Specification of oil samples

| Samples | Fatty acids (%) | | |
|---|---|---|---|
| | Saturated | Monounsaturated | Polyunsaturated |
| Sunflower oil (SO) | 10 | 20 | 70 |
| High Oleic Sunflower oil (HOSO) | 8 | 81 | 11 |

A series of fat blends were prepared as shown in Table 3. The blends comprise palm oil fraction which has been diluted to obtain different SFA levels (25-50%) using Sunflower oil (SO) or High Oleic Sunflower oil (HOSO). It is to be noted that the Blend 1 (a-f) are comparative blends. The investigated blends were compared with a control prepared using coconut oil and palm olein containing higher levels of SFA (76.5%) and existing 2 commercial low SFA ice-cream coating fat with 51 and 44% SFA respectively.

TABLE 3

% SFA content of the fat blends

| Fat blends | Proportion of fats | SFA Content (%) |
|---|---|---|
| Control blend | Coconut oil (70%) + Palm olein (30%) | 76.5 |
| Blend 1 (a-f) | Fractionated Palm Oil + SO | 25-50 |
| Blend 2 (a-f) | Fractionated Palm Oil + HOSF | 25-50 |

Figure 2:
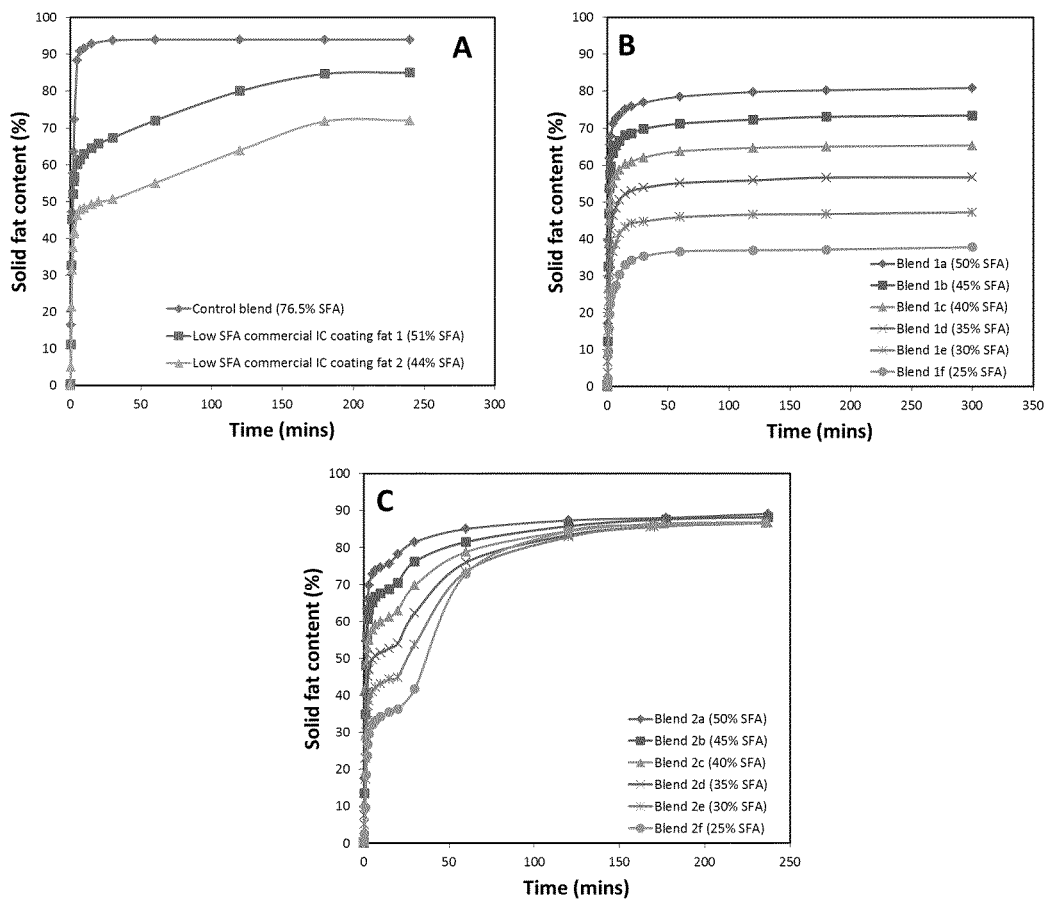
FIG. 2 shows the evolution of Solid fat content of frozen confection coating fat blends with time, exhibiting different SFA content: (A) Control blend of coconut oil blended with palm olein, (B) Low SFA commercial ice-cream coating fats of palm mid fraction blended with Sunflower oil (1a-1f), and (C) Palm fraction blended with High Oleic Sunflower oil (2a-2f). All the blends were crystallized isothermally at −15° C.

It is clearly evident from FIG. 2A, the control blend containing high amount of SFA (76.5%) displayed faster crystallization kinetics achieving high solid fat content (90%) within a minute of crystallization at −15° C. However, low SFA commercial ice-cream fats displayed lower solid fat content which was proportional to the amount of SFA present in the fats at −15° C. Similar phenomenon was found in the fat blends with reduced SFA content prepared using fractionated palm oil and vegetable oil like SO (Blend 1a-f), the amount of solid fat content decreased with reduced SFA (FIG. 2B). No increase in the solid fat profiles of the blends was found even after holding 5 h at −15° C. However, surprisingly a reverse phenomenon was found when the low SFA fat blends were prepared using HOSO (FIG. 2C, Blend 2a-2f). Despite variation in SFA levels, all the blends displayed 'two-step' crystallization and was able to achieve similar solid fat content (~85%) after holding 1 to 2 h at −15° C.

Figure 3:
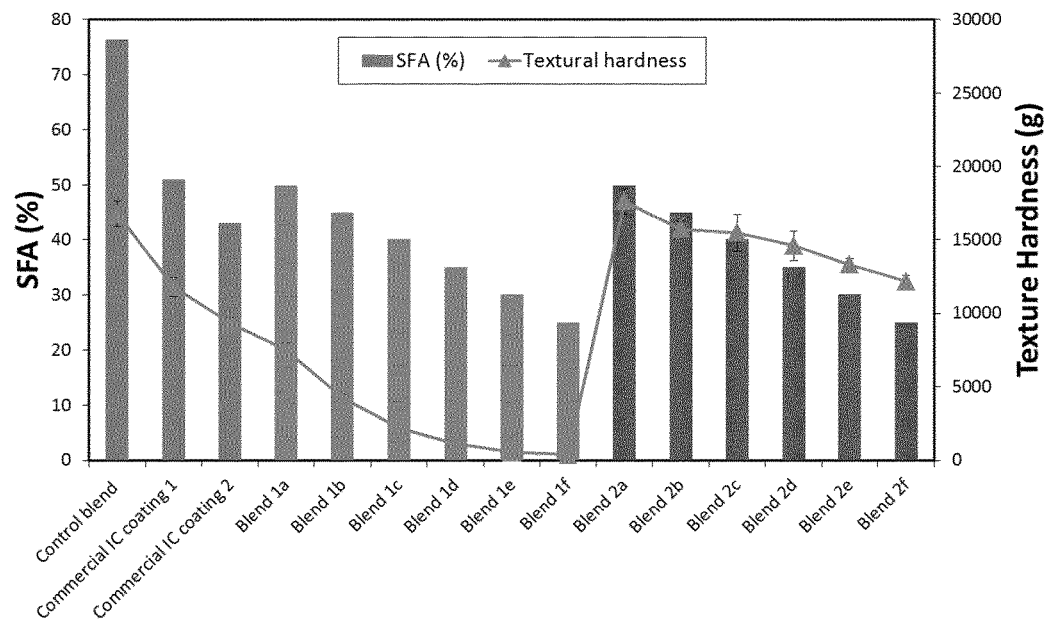
FIG. 3 shows % SFA content and textural hardness of the different fat blends measured by penetrometry at room temperature after crystallizing overnight at −15° C.

FIG. 3 shows % SFA content and textural hardness of the different fat blends measured by penetrometry after crystallizing overnight at −15° C. Penetrometry is a conventional method to evaluate the textural hardness of crystallized fats. The low SFA HOSO blends displayed comparable textural hardness with the control blend and much higher hardness than that of the low SFA commercial Ice-cream fats and blends diluted with SO.

Example 2

Fat compositions (Fat blend 3-8) were prepared by blending different hard fats and liquid oils illustrated in Table 1, 2 and 4. Fat blend 3-5 are comparative compositions whereas fat blend 6-8 are from the present invention. All the fat blends contained similar SFA content of 40%.

TABLE 4

Specification of fat samples

| Specifications | Samples | | |
|---|---|---|---|
| | Shea stearin | Cocoa Butter | Palm stearin |
| Slip melting point (° C.) | 43 | 34 | 52 |
| Iodine value (gI2/100 g) | 35 | 35 | 34 |
| Saturated fatty acids (%) | 64 | 64 | 67 |
| Monounsaturated fatty acids (%) | 34 | 34 | 27 |
| Polyunsaturated fatty acids (%) | 2 | 2 | 6 |
| Solid fat content (%) | 20° C.-80 | 20° C.-76 | 20° C.-60 |
| | 25° C.-68 | 25° C.-55 | 30° C.-40 |
| | 30° C.-45 | 30° C.-32 | |
| | 35° C.-5 | 35° C.-<1 | |

Fat blend 3=51 wt % Hard Palm mid fraction+5 wt % Shea stearin+44 wt % SO

Fat blend 4=50 wt % Hard Palm mid fraction+5 wt % Cocoa Butter+45 wt % SO

Fat blend 5=51 wt % Hard Palm mid fraction+5 wt % Palm stearin+44 wt % SO

Fat blend 6=52 wt % Hard Palm mid fraction+5 wt % Shea stearin+43 wt % HOSO

Fat blend 7=52 wt % Hard Palm mid fraction+5 wt % Cocoa Butter+43 wt % HOSO

Fat blend 8=52.5 wt % Hard Palm mid fraction+5 wt % Palm stearin+42.5 wt % HOSO

All the fat blends (3-8) displayed similar levels of SFC i.e. ~45% after 2 min of crystallization at −15° C. (Table 5). Further after 60 min of crystallization the comparative fat blends (3-5) containing SO, showed no increase in the SFC profiles even after 5 hr holding at −15° C. However, it was surprisingly found that fat blends (6-8) containing HOSO and similar levels of SFA i.e. 40% as the comparative fat blends (3-5), displayed much higher levels of SFC after 60 min of crystallization at −15° C. and continued to increase until 5 hr of holding demonstrating 'two-step crystallization' phenomenon (Table 5).

TABLE 5

Evolution of Solid fat content of frozen confection coating fat blends at −15° C. with time containing similar SFA level (40%)

| Samples | % SFC after 2 min | % SFC after 60 min | % SFC after 5 hr |
|---|---|---|---|
| Fat blend 3 | 44 | 62 | 64 |
| Fat blend 4 | 43 | 61 | 63 |
| Fat blend 5 | 44 | 61 | 63 |
| Fat blend 6 | 46 | 74 | 84 |
| Fat blend 7 | 46 | 74 | 85 |
| Fat blend 8 | 48 | 69 | 84 |

Table 6 illustrates textural hardness of the different fat blends (3-8) measured by penetrometry after crystallizing overnight at −15° C. Surprisingly, the fat blends containing HOSO (6-8) displayed higher textural hardness compared to fat blends diluted with SO (3-5).

TABLE 6

Textural hardness

| Samples | Textural hardness (g) |
|---|---|
| Fat blend 3 | 3943 ± 424 |
| Fat blend 4 | 3197 ± 416 |
| Fat blend 5 | 2873 ± 318 |
| Fat blend 6 | 9280 ± 1200 |
| Fat blend 7 | 9812 ± 1075 |
| Fat blend 8 | 7910 ± 731 |

Example 3

Fat compositions (Fat blend 9-12) included in the present invention were prepared by blending hard palm mid fraction and liquid oils illustrated in Table 1 and 7. All the fat blends contained similar SFA content of 40%.

TABLE 7

Specification of oil samples

| Samples | Fatty acids (%) | | |
|---|---|---|---|
| | Saturated | Monounsaturated | Polyunsaturated |
| High Oleic Soybean oil (HOSBO) | 10 | 75 | 15 |
| High Oleic Canola oil (HOCO) | 8 | 70 | 22 |
| High Oleic Algal oil (HOAO) | 10 | 85 | 5 |
| Olive oil (OO) | 14 | 72 | 14 |

Fat blend 9=57 wt % Hard Palm mid fraction+43 wt % HOSBO

Fat blend 10=57 wt % Hard Palm mid fraction+43 wt % HOCO

Fat blend 11=57 wt % Hard Palm mid fraction+43 wt % HOAO

Fat blend 12=52 wt % Hard Palm mid fraction+48 wt % OO

All the fat blends (9-12) displayed similar levels of SFC i.e. ~47% after 2 min of crystallization at −15° C. (Table 8). However, it was surprisingly found that all fat blends displayed higher levels of SFC after 60 min of crystallization at −15° C. and continued to increase until 5 hr of holding demonstrating 'two-step crystallization' phenomenon (Table 8).

TABLE 8

Evolution of Solid fat content of frozen confection coating fat blends at −15° C. with time containing similar SFA level (40%)

| Samples | % SFC after 2 min | % SFC after 60 min | % SFC after 5 hr |
|---|---|---|---|
| Fat blend 9 | 47 | 70 | 84 |
| Fat blend 10 | 48 | 66 | 82 |
| Fat blend 11 | 47 | 87 | 94 |
| Fat blend 12 | 43 | 80 | 88 |

Table 9 illustrates textural hardness of the different fat blends (9-12) measured by penetrometry after crystallizing overnight at −15° C. Surprisingly, the fat blends containing liquid oil higher in monounsaturates (9-12) displayed higher textural hardness compared to comparative fat blends mentioned in earlier examples (FIG. 3; Table 6).

TABLE 9

Textural hardness

| Samples | Textural hardness (g) |
|---|---|
| Fat blend 9 | 12730 ± 320 |
| Fat blend 10 | 11124 ± 1500 |
| Fat blend 11 | 17118 ± 269 |
| Fat blend 12 | 13852 ± 1028 |

Example 4

Fat compositions (Fat blend 13-16) included in the present invention were prepared by blending hard palm mid fraction and liquid oils illustrated in Table 1, 2 and 10. All the fat blends contained similar SFA content of 40%.

TABLE 10

Specification of oil samples

| | Fatty acids (%) | | |
|---|---|---|---|
| Samples | Saturated | Monounsaturated | Polyunsaturated |
| High Oleic High stearic oil (HO-HSSO) | 36 | 56 | 6 |
| Hazelnut oil (HO) | 12 | 75 | 13 |
| *Macadamia* oil (MO) | 10 | 82 | 8 |
| Avocado oil (AO) | 12 | 75 | 13 |

Fat blend 13=52 wt % Hard Palm mid fraction+38 wt % HOSO+10 wt % HO-HSSO
Fat blend 14=56 wt % Hard Palm mid fraction+34 wt % HOSO+10 wt % HO
Fat blend 15=56 wt % Hard Palm mid fraction+34 wt % HOSO+10 wt % MO
Fat blend 16=56 wt % Hard Palm mid fraction+34 wt % HOSO+10 wt % AO All the fat blends (13-16) displayed similar levels of SFC i.e. ~46% after 2 min of crystallization at −15° C. (Table 11). However, it was surprisingly found that all fat blends displayed higher levels of SFC after 60 min of crystallization at −15° C. and continued to increase until 5 hr of holding demonstrating 'two-step crystallization' phenomenon (Table 11).

TABLE 11

Evolution of Solid fat content of frozen confection coating fat blends at −15° C. with time containing similar SFA level (40%)

| Samples | % SFC after 2 min | % SFC after 60 min | % SFC after 5 hr |
|---|---|---|---|
| Fat blend 13 | 45 | 71 | 84 |
| Fat blend 14 | 47 | 74 | 85 |
| Fat blend 15 | 46 | 67 | 83 |
| Fat blend 16 | 46 | 67 | 81 |

Table 12 illustrates textural hardness of the different fat blends (13-16) measured by penetrometry after crystallizing overnight at −15° C. Surprisingly, the fat blends containing liquid oil higher in monounsaturates (13-16) displayed higher textural hardness compared to comparative fat blends mentioned in earlier examples (FIG. 3; Table 6).

TABLE 12

Textural hardness

| Samples | Textural hardness (g) |
|---|---|
| Fat blend 13 | 12421 ± 1510 |
| Fat blend 14 | 13237 ± 927 |
| Fat blend 15 | 12623 ± 160 |
| Fat blend 16 | 12977 ± 329 |

Example 5

Frozen confection coating recipes with varying SFA and fat content prepared at pilot plant scale has been elaborated in Table 13. Low SFA frozen confection coating containing SO (Recipe 1; comparative example) and three different low SFA Ice confection coatings from the present invention (Recipe 2, 3 and 4) were prepared for feasibility test. The compound coatings were made by first blending the dry ingredients with part of the fat blend, followed by refining and treating the mixture in a Stephan mixer at 50° C. where the residual fat and the lecithin was added and mixed into the blend.

TABLE 13

Ice confection coating recipes with varying SFA and fat content

| Ingredients | Recipe 1 | Recipe 2 | Recipe 3 | Recipe 4 |
|---|---|---|---|---|
| Hard palm mid fraction | 45.7 | 31.8 | 28.9 | 26 |
| SO | 10.7 | — | — | — |
| HOSO | — | 21.8 | 19.6 | 17.4 |
| Sugar | 29.9 | 32.0 | 35.6 | 39.1 |
| Milk Skimmed Powder | 4.2 | 4.5 | 5.0 | 5.5 |
| Cocoa Powder (10-12% Fat) | 9 | 9.6 | 10.7 | 11.7 |
| Lecithin | 0.5 | 0.5 | 0.5 | 0.7 |
| Total fat | 58 | 55 | 50 | 45 |
| % SFA in the recipe | 30.1 | 22 | 20 | 18 |
| Particle size ($D_{90}$) | 28 | 30 | 24 | 30 |

Example 6

This example provides information regarding the rheological properties (i.e. Plastic viscosity and Yield stress) of the coating recipes with varying SFA and fat content (Table 13). The rheological properties were measured using Physica MCR (rheometer model) 501-Anton Paar (Germany) system with geometry: CC27/S (Serial Number: 20689).

Due to variation in fat content in the coating recipes, the overall proportion of the solid ingredients (Sugar, Cocoa powder and Skimmed milk powder) was different. However, the ratio between the solid ingredients across the recipes was kept the same. Impact of varying the ratio of the solid ingredients were observed not to significantly impact the plastic viscosity and pick-up weight, at similar fat content (internal evaluation). Although plastic viscosity and pick-up weight increased with lower fat content.

TABLE 14

Plastic viscosity (Pa · s) and Yield stress (Pa) of the different recipes

| Temperature (° C.) | Plastic viscosity (Pa · s) | Yield stress (Pa) |
|---|---|---|
| Recipe 1 | | |
| 45 | 0.19 | 0.30 |
| 40 | 0.21 | 0.32 |
| 35 | 0.26 | 0.35 |
| 30 | 0.31 | 0.40 |
| Recipe 2 | | |
| 45 | 0.20 | 0.30 |
| 40 | 0.23 | 0.33 |
| 35 | 0.27 | 0.36 |
| 30 | 0.32 | 0.40 |
| Recipe 3 | | |
| 45 | 0.34 | 0.58 |
| 40 | 0.40 | 0.61 |
| 35 | 0.46 | 0.66 |
| 30 | 0.56 | 0.73 |
| Recipe 4 | | |
| 45 | 0.60 | 1.22 |
| 40 | 0.69 | 1.28 |
| 35 | 0.80 | 1.36 |
| 30 | 0.95 | 1.48 |

Example 7

This example gives details of the coating properties of the recipes with varying SFA and fat content. Ice-cream sticks with surface temperature −13° C. to −15° C. was coated with the different coating recipes (Table 13) by dipping. The coatings were maintained at a constant temperature (e.g. 30, 35, 40° C.) before dipping. Comparison of coating properties between each coating recipes are shown in Table 15.

TABLE 15

Comparison of coating properties of the different recipes

| Temperature (° C.) | Pick-up weight (g) | Dripping time (s) | Setting time (s) |
|---|---|---|---|
| Recipe 1 | | | |
| 40 | 15.3 | 13 | 20 |
| 35 | .16.5 | 12 | 16 |
| 30 | 17.7 | 11 | 14 |
| Recipe 2 | | | |
| 40 | 14.0 | 12 | 17 |
| 35 | 15.7 | 13 | 19 |
| 30 | 16.9 | 12 | 18 |

TABLE 15-continued

Comparison of coating properties of the different recipes

| Temperature (° C.) | Pick-up weight (g) | Dripping time (s) | Setting time (s) |
|---|---|---|---|
| Recipe 3 | | | |
| 40 | 18.1 | 21 | 25 |
| 35 | 21.0 | 18 | 21 |
| 30 | 21.2 | 18 | 28 |
| Recipe 4 | | | |
| 40 | 23.9 | 26 | 35 |
| 35 | 26.1 | 26 | 34 |
| 30 | 28.1 | 26 | 38 |

The dripping time (i.e. time required to crystallize the coatings on the Ice-cream surface after dipping) and pick-up weight (i.e. amount of coating crystallized on the Ice-cream surface) was found to increase with decrease in the fat content as well as SFA in the coating. This is of no surprise as with lower fat content, plastic viscosity and yield stress of coatings increase (Table 14) However, coating Recipe 2 containing HOSO displayed similar pick-up weight, dripping time and setting time to that of Recipe 1 which contained SO. Both the recipes had comparable fat content but Recipe 2 contained 27% less SFA than that of Recipe 1. (Recipe 4).

The higher plastic viscosity and yield stress value of the recipes with reduced fat content can be controlled via applying other emulsifiers or combination of emulsifiers (for e.g. PGPR or Lecithin and PGPR). It is already known that PGPR reduce dramatically the yield value of compound coatings even at very low dosage (0.2 wt. %). The strong effect on the yield value makes it possible to reduce the pick-up of coating per frozen confection and in lowering the fat content of the coating. Higher pick-up weight of the coatings can also be reduced by increasing the dipping temperature of the coatings (for e.g. 45° C.). However, care should be taken so that physical properties of the frozen confection are not affected by the higher temperature.

Example 8

Approximately 30 grams of a coating of composition with recipes 1 to 4 were poured in plastic cups and crystallized for 1 day at −15° C. Then the samples were stored for 1 week at −25° C. to stabilize and mimic the industrial frozen confection storage temperature.

After 1 week the hardness of the tablets was measured at room temperature i.e. about 20° C. with a TA-HDi texture analyzer from Stable Micro Systems Ltd, Surrey, United Kingdom using a needle probe of 4.15 mm diameter, speed 1 mm/sec and 5 mm penetration. 5 replicates were performed to record the maximum force of penetration. The results obtained are given in table 16.

TABLE 16

Textural hardness measurements

| Coating recipes | Textural Hardness (g) |
|---|---|
| Recipe 1 | 16550 ± 1000 |
| Recipe 2 | 24120 ± 1000 |
| Recipe 3 | 22360 ± 2500 |
| Recipe 4 | 27171 ± 1200 |

In general, the textural hardness of the recipes increased with decreasing fat and SFA content. All the recipes containing HOSO in the fat blend in accordance with the invention (i.e. Recipe 2 to 4) showed higher textural hardness than that of Recipe 1 (comparative example) which contained SO and was higher in SFA content.

Example 9

Frozen confection coating recipes with varying SFA and fat content prepared at pilot plant scale has been elaborated in Table 17. The compound coatings were made by first blending the dry ingredients with part of the fat blend, followed by refining and treating the mixture in a Stephan mixer at 50° C. where the residual fat and the emulsifiers (lecithin and PGPR) was added and mixed into the blend.

TABLE 17

Ice confection coating recipes with varying SFA and fat content

| Ingredients | Recipe 5 | Recipe 6 |
| --- | --- | --- |
| Hard palm mid fraction | 14.06 | 34 |
| HOSO | 16.24 | 42.32 |
| Sugar | 46.81 | 18.30 |
| Milk Skimmed Powder | 8.50 | 2.17 |
| Cocoa Powder (10-12% Fat) | 13.62 | 4.43 |
| Lecithin | 0.5 | — |
| PGPR | 0.2 | — |
| Total fat | 32 | 77 |
| % SFA in the recipe | 11 | 25 |

Example 10

This example provides information regarding the rheological properties (i.e. Plastic viscosity and Yield stress) of the coating recipes with varying SFA and fat content (Table 18). The rheological properties were measured using Physica MCR (rheometer model) 501-Anton Paar (Germany) system with geometry: CC27/S (Serial Number: 20689).

TABLE 18

Plastic viscosity (Pa · s) and Yield stress (Pa) of the different recipes

| Temperature (° C.) | Plastic viscosity (Pa · s) | Yield stress (Pa) |
| --- | --- | --- |
| Recipe 5 | | |
| 40 | 1.59 | 1.43 |
| 35 | 1.93 | 1.54 |
| 30 | 2.41 | 1.77 |
| Recipe 6 | | |
| 40 | 0.05 | 0.03 |
| 35 | 0.06 | 0.04 |
| 30 | 0.07 | 0.05 |

Example 11

This example gives details of the coating properties of the recipes with varying SFA and fat content. Ice-cream sticks with surface temperature −13° C. to −15° C. was coated with the different coating recipes (Table 17) by dipping. The coatings were maintained at a constant temperature i.e. 35° C. before dipping. Comparison of coating properties between each coating recipes are shown in Table 19.

TABLE 19

Comparison of coating properties of the different recipes

| Temperature (° C.) | Pick-up weight (g) | Dripping time (s) | Setting time (s) |
| --- | --- | --- | --- |
| Recipe 5 | | | |
| 35 | 27.388 | 31 | 50 |
| Recipe 6 | | | |
| 35 | 8.84 | 9 | 32 |

The dripping time and pick-up weight was found to increase with decrease in the fat content as well as SFA in the coating. This is of no surprise as with lower fat content, plastic viscosity and yield stress of coatings increase (Table 18).

The higher plastic viscosity and yield stress value of the recipes with reduced fat content can be reduced by increasing the dipping temperature of the coatings (for e.g. 40-45° C.). However, care should be taken so that physical properties of the frozen confection are not affected by the higher temperature.

Example 12

After 1 week of storage at −20° C. the textural hardness of the coated frozen confection samples was measured at −18° C., where the coated frozen confections were mechanically stressed by bending, using a strength texture apparatus (Zwick Roell Z005, equipped with a 50 kN captor). The samples were re-equilibrated at least one minute at −18° C. before measurement. The coated frozen confections were laid on two supports having a cylindrical profile of radius 1.5 mm and being 35 mm apart from each other. The measurements were performed with a constant cross head speed of 2 mm/s. 5 replicates were performed to record the maximum force to break the coatings. The results obtained are given in table 20. The textural hardness index is defined as the texture per thickness of the frozen confection coating. The textural hardness index was found to be higher for the recipe containing higher fat and SFA content.

TABLE 20

Textural hardness measurements

| Coating recipes | Textural Hardness index (g/mm) |
| --- | --- |
| Recipe 5 | 3882 ± 212 |
| Recipe 6 | 6714 ± 397 |

Example 13

This example provides details regarding the wrapping of the coated frozen confection, wherein the at least partly coated frozen confection is wrapped before the second crystallization phase takes place. Frozen confections after at least partly dipping in the coating recipes (Recipe 1 to 6) described in the previous example were allowed to drip to remove excess coating and hold for complete setting i.e. first crystallization phase (FIG. 4A). The individual dripping and setting time of the coating recipes are listed in Table 4.

Figure 4:
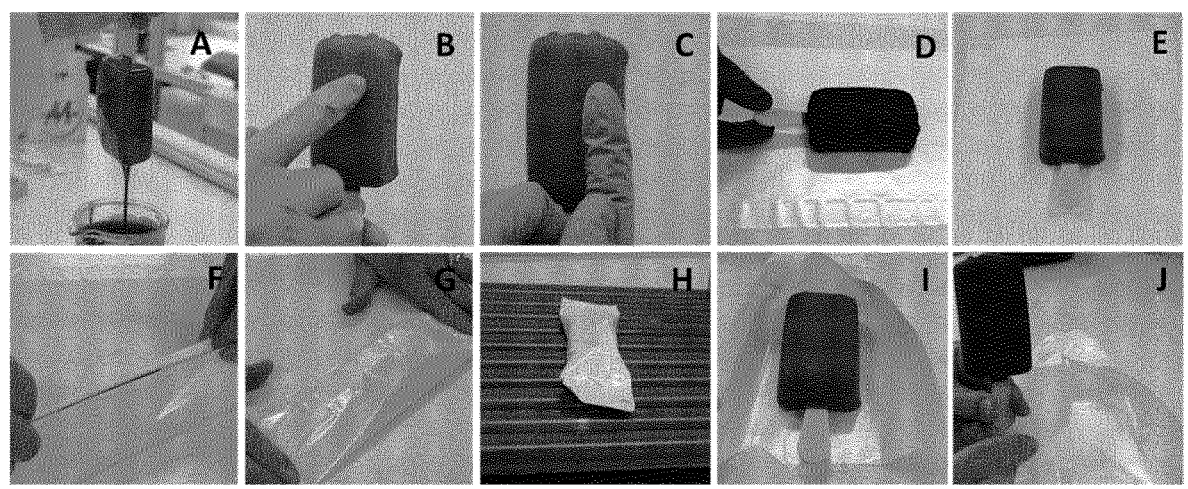
FIG. 4: Inspection of setting time (s) of a low SFA coating described in this invention after dipping a frozen confection using nitrile hand gloves (A-C) followed by wrapping (D-G) and evaluation of mechanical resistance of the frozen confections (H-J).

After dripping of the excess coatings, setting time of the coatings were calculated by touching coated surface of the frozen confections wearing nitrile hand gloves. Inspection was carried until no traces of the compound coatings were observed to adhere on the gloves. These holding times were recorded as the setting time for particular coating recipes. Finding the correct setting time ensured generation of sufficient solid fat content (i.e. 20 to 50%) after 'first step' of crystallization of the coatings. The coated frozen confections were then placed over a standard stick-on wrapper for wrapping frozen confections and were wrapped as quickly as possible. FIG. 4 (A-J) shows inspection of setting time of a low SFA coating (Recipe 2) using nitrile hand gloves followed by manual wrapping and evaluation of mechanical resistance of the frozen confections.

In order to check feasibility of the partially crystallized coatings in terms of mechanical resistance, the wrapped frozen confections were placed on a laboratory benchtop roller mixer (Stuart roller mixer, SRT2) and were kept moving for approximately 5 min (FIG. 4H). After 10 min the frozen confections were examined for cosmetic damages i.e. cracks or fractures. No significant damages were observed in any of the frozen confections coated with the coating recipes 1 to 4. This demonstrates that partial 'first step' of crystallization of the coatings was adequate to allow wrapping and further protect during transportation of the frozen confections for storage.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of manufacturing a frozen confection, the method comprising:
    providing the frozen confection to be coated;
    providing a coating composition which comprises less than 25% of saturated fatty acids by weight of the coating composition, and the coating composition solidifies in a two-step crystallization at a temperature of −15° C.;
    at least partly coating the frozen confection to form a coating;
    letting the coating perform a first crystallization event;
    wrapping the frozen confection within 2 minutes after the coating of the frozen confection; and
    storing the at least partly coated frozen confection that has been wrapped at a temperature which will allow a second crystallization event in the coating,
    the coating composition comprises unsaturated fatty acids comprising monounsaturated fatty acids that are 10-60 wt. % of the coating composition and polyunsaturated fatty acids that are less than 10 wt. % of the coating composition,
    the saturated fatty acids comprise between 16-24 C-atoms, and the unsaturated fatty acids comprise at least 18 C-atoms,
    the coating composition comprises a fat blend of hard fat and liquid oil, the hard fat is at least 70 wt. % solid fat at 20° C., and the liquid oil is liquid at 20° C. and contains less than 5 wt. % of solid fat content at 0° C., and the coating composition further comprises 20 to 70 wt. % of non-fat solids,
    the hard fat in the fat blend is 30 to 40 wt. % of the coating composition, and the liquid oil in the fat blend is 10 to 25 wt. % of the coating composition,
    the hard fat comprises hard palm mid fraction, and
    the liquid oil comprises at least one of high oleic sunflower oil or high oleic soybean oil.

2. The method according to claim 1, wherein the at least partly coated frozen confection is wrapped before the second crystallization event takes place.

3. The method according to claim 1, wherein a solid fat content of the coating is between 20 to 50% when the frozen confection is wrapped.

4. The method according to claim 1, wherein the frozen confection is wrapped at room temperature or at a temperature below.

5. The method according to claim 1, wherein the coating composition comprises 35 to 65 wt % non-fat solids.

6. The method according to claim 1 further comprising providing a structuring agent in an amount of between about 0.2% and 3% by weight of the coating, which is sufficient to provide strength and faster crystallization kinetic properties to the coating.

7. The method according to claim 1, wherein the fat blend of hard fat and liquid oil at a temperature of −15° C. displays a solid fat content of 20 to 50% within 2 min. of crystallization.

8. The method according to claim 1, wherein the hard fat comprises above 60% of the saturated fatty acid, C16 fatty acids amounting to 55% or more of the total fatty acids of the hard fat; and the hard fat displays above 70% of solid fat content at 20° C.

9. The method according to claim 1, wherein the liquid oil comprises
    above 65% of monounsaturated fatty acid;
    below 10% of polyunsaturated fatty acid; and
    displays below 5% of solid fat content at 0° C.; and
    the unsaturated fatty acid contains 18C-atoms or more than 18C-atoms.

10. The method according to claim 1, wherein the non-fat solids are selected from the group consisting of sugar, fibres, cocoa powder, milk powder, emulsifier, one or more flavours, and combinations thereof.

11. The method according to claim 1, wherein the coating composition comprises 20-40% of monounsaturated fatty acid.

12. The method according to claim 1, wherein the coating composition comprises less than 5% of polyunsaturated fatty acid.

13. The method according to claim 1, wherein the hard fat comprises above 75% of solid fat content at 20° C.

* * * * *